United States Patent [19]

De Leo et al.

[11] 4,265,112

[45] May 5, 1981

[54] PNEUMATIC AVERAGER

[75] Inventors: Richard V. De Leo, Hopkins; Floyd W. Hagen, Eden Prairie, both of Minn.

[73] Assignee: Rosemount Inc., Minneapolis, Minn.

[21] Appl. No.: 38,208

[22] Filed: May 11, 1979

[51] Int. Cl.³ .............................................. G01C 21/00
[52] U.S. Cl. .................................. 73/180; 235/200 R
[58] Field of Search ...................... 73/180; 235/200 R; 137/605

[56] References Cited

U.S. PATENT DOCUMENTS

| | | | |
|---|---|---|---|
| 3,228,247 | 1/1966 | Hansen et al. | 73/180 |
| 3,318,146 | 5/1967 | De Leo et al. | 73/180 |
| 3,364,742 | 1/1968 | De Leo | 73/180 |
| 3,482,445 | 12/1969 | De Leo et al. | 73/180 |
| 3,488,154 | 1/1970 | Hronas | 137/605 |
| 3,585,859 | 6/1971 | De Leo et al. | 73/212 |
| 4,096,744 | 6/1978 | De Leo et al. | 73/180 |

*Primary Examiner*—Donald O. Woodiel
*Attorney, Agent, or Firm*—Kinney, Lange, Braddock, Westman and Fairbairn

[57] ABSTRACT

A pneumatic pressure averager primarily for use in connection with aircraft instrumentation, which provides for three pressure outputs available from two pressure sources. Two of the outputs represent the input pressures directly, and the third output represents the average of the pressure from the two separate input sources.

8 Claims, 4 Drawing Figures

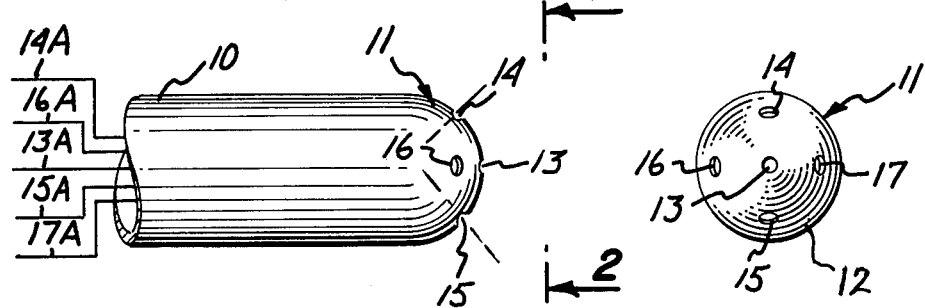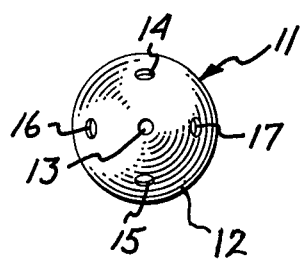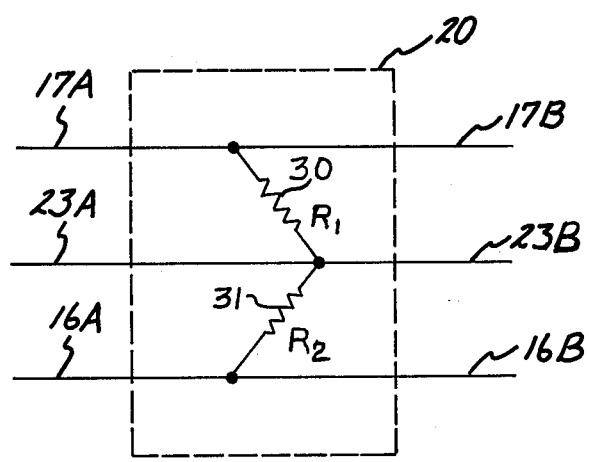

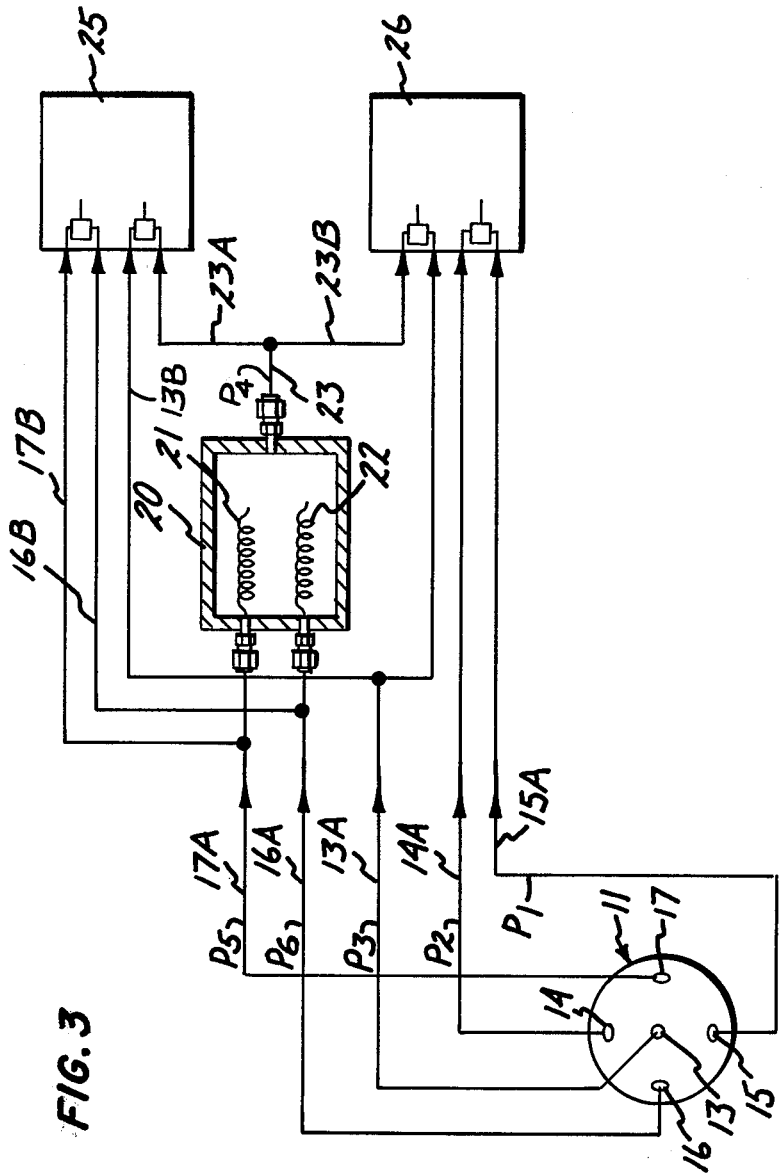

PNEUMATIC AVERAGER

BACKGROUND OF THE INVENTION

1. Field of the Invention

The present invention relates to pneumatic averaging devices for averaging two or more input pressure signals while permitting the input pressure signals to also be utilized separately.

2. Prior Art

In the prior art, air data probes have been advanced which rely upon determining the differential between pressures at ports on a hemispherical head for determining the angle of attack or angle of sideslip of an aircraft. One such device is shown in U.S. Pat. No. 3,318,146, which describes the basic equations for determining angle of attack, angle of sideslip, Mach number and other air data parameters from a hemispherical head probe which has five pressure ports at the forward or leading end. U.S. Pat. No. 3,364,742 shows an air data sensing probe having orifice restrictors in each of two instrument lines leading from an input chamber. The restrictors are used to permit a single probe to operate dual systems or instruments.

Additionally, static sensing probes which provide for an average or normalized static pressure wherein the static pressure is sensed at two different ports plumbed into a single outlet are illustrated in U.S. Pat. Nos. 3,482,445, 3,585,859 and 4,096,744. All these patents also include surface contouring for providing a desired pressure profile along the probe itself for pressure compensation. In each instance rather than providing for an average pressure difference output between two of the sensing ports, and also providing for signals indicating the pressure at the two inputs that are averaged, only the average or normalized pressure is provided for use. U.S. Pat. No. 4,096,744 (FIG. 9) also illustrates the averaging of right and left sensor outputs by manifolding from sensors on opposite sides of an aircraft fuselage.

In the computation of angle of attack ratio derived from a hemisphere-cylinder flow angle sensor, such as that shown in U.S. Pat. No. 3,318,146, equations in the patent and also those described on Page 3 of Bulletin 1014 (copyright 1974) of Rosemount Inc., the owner of U.S. Pat. No. 3,318,146 indicate that for angle of attack and sideslip utilizing a five hole sensing probe, the pressure designated "$p_4$" can be derived from pneumatic pressure averaging (which is merely manifolding the two pressures together) within the sensor itself. It should be noted that when both angles of attack and sideslip are desired from a single sensor, it is necessary to compute. These equations are described on Page 3 of the bulletin and in the patent. A study of these equations will indicate that if a single failure is experienced in the pressures utilized for the differential pressure measurements or in the computation circuitry that is utilized, there would be a failure in both the ratio determinations for angle of attack and angle of sideslip.

A common transducer configuration made by Rosemount Inc. for aircraft mounting is a two sensor air data module made specifically for calculating angle of attack or angle of sideslip where the pneumatic average of two of the ports, designated $p_4$, is obtained. In a typical application, it has now become desirable to measure both the angle of attack and angle of sideslip using two transducer air data modules. For this application the average pressure $p_4$ between two of the ports on the hemispherical head is necessary as well as the individual pressures that are averaged. As herein shown, two air data modules, each with two pressure sensors, can be utilized to compute angle of attack, and angle of sideslip and each system is then completely independent rather than cross coupled. The present invention provides for redundancy in operation.

SUMMARY OF THE INVENTION

The present invention relates to a pneumatic averaging device which provides an average output pressure from two or more inputs, and which permits sensing not only the average output pressure but each of the individual input pressures as well.

In the specific form of the invention, the averaging device comprises a chamber having a plurality (two) of inputs. Fluid resistors are provided from the conduit, carrying each of the pressure inputs into a chamber. Additionally, the conduits carrying the input pressures are connected through suitable connections to other equipment which use the individual input pressures. The chamber opens to the input conduit only through the fluid resistors and is maintained at a pressure averaging the two pressures. The fluid resistors are substantial restrictors which permit using the input pressures without adversely affecting the signals of the inputs or the averaged output.

In the form shown, the averaged pressure is utilized for air data sensing, in particular, and the inputs are pressures that are sensed at a probe or sensing module.

The pneumatic averager of the present invention also can be used for preventing cross flow between ports which now are normalized or averaged by common connections (T connection for example). For example during sideslip maneuvers in an aircraft where there may be cross flow between the ports that are used for providing the necessary pressure function, the insertion of the pneumatic averager of the present invention would limit such cross flow and prevent incorrect outputs due to the asymmetry in the pneumatic plumbing connections which sometimes affect the accuracy of the pneumatic averaged pressure being utilized.

BRIEF DESCRIPTION OF THE DRAWINGS

FIG. 1 is a fragmentary side view of a typical probe utilized for obtaining the pressures in an air data sensing instrument shown only fragmentarily;

FIG. 2 is an end view of the upstream facing end of the probe of FIG. 1;

FIG. 3 is a schematic representation of a typical arrangement utilized with the probe shown in FIGS. 1 and 2 providing outputs indicating both angle of attack and angle of sideslip utilizing the pneumatic averager of the present invention; and FIG. 4 is a schematic representation of the pressure averager circuit shown in FIG. 3 utilizing symbols which permit an electrical analogy to be made with the pneumatic circuit.

DESCRIPTION OF THE PREFERRED EMBODIMENT

Referring to FIG. 1, an air data sensing probe indicated generally at 10 comprises a barrel of usual design that is mounted in a proper location on an aircraft, with an end portion indicated generally at 11 facing upstream. The end is hemispherical, as shown, and similar to that shown in Patent No. 3,318,146.

As shown in FIG. 2, the end portion 11 has a hemispherical surface 12, which is provided with individual ports or openings comprising drilled holes. Each of the openings generally has an axis through the wall of the probe that is normal to a tangent line at the intersection of the axis and the surface, so that the axes are generally as represented by the lines shown in FIG. 1.

As shown, the hemispherical end surface 12 has a center port 13, (on the longitudinal axis of the probe barrel), top and bottom ports 14 and 15, which as shown have their axis lying in a common plane passing through the axis of port 13 and that is generally perpendicular to the reference plane of the aircraft. The plane of the axes of ports 14 and 15 is the plane in which aircraft pitch or angle of attack is measured. Additionally, there are a pair of ports 16 and 17 which have their axis defining a plane passing through the axis of port 13 and at substantially right angles to the plane defined by the axis of ports 14, 15 and 13. The ports 16 and 17 therefore lie in a plane which defines the normal reference plane for the aircraft and the yaw or sideslip of the aircraft is measured in this reference plane.

Each of the individual ports on the probe has a separate conduit connecting the respective port to remote instruments. These conduits are shown schematically in FIG. 1 as 13A, 14A, 15A, 16A, and 17A. The conduits are fluid pressure carrying tubes utilized for providing necessary pressure signals to remote locations in the aircraft.

When the type of probe shown in FIGS. 1 and 2 is utilized for determining both angle of attack and sideslip, three differential outputs are necessary. With the present device, the individual signals from conduits 14A through 17A are utilized to determine the angle of attack and angle of sideslip. The port 13 senses the pitot pressure or stagnation pressure. One necessary pressure signal is obtained with the pneumatic averager of the present invention. As shown in FIG. 3, the pressures from ports 16 and 17, as carried in conduits 16A and 17A are coupled to a pneumatic averaging chamber shown schematically at 20. The chamber 20 is a closed fixed volume chamber in use, and the pressure conduits 16A and 17A are open to this chamber only through elongated capillary tubes or similar fluid flow restrictors 21 and 22. Resistor 21 leads from conduit 17A and resistor 22 leads from conduit 16A. Also note that the conduits 16A and 17A are connected separately to further instrumentation so that the pressure signals carried, (as designated $P_5$ and $P_6$ in the disclosure) are provided to suitable pneumatic computation apparatus indicated generally at 25 through lines 17B and 16B. The computation apparatus 25 also can be connected to the "$p_3$", or the pitot pressure signal along line 13A through a line 13B. However, the output from the chamber 20 comprising the pneumatic average of $p_5$ and $p_6$ is along line 23 and is connected to the apparatus 25 through a branch line 23A. The chamber 20 and the conduit 23 comprise output fluid pressure carrying means. With known differential pressure transducers and other known equipment, the output of computation apparatus 25 will be equal to the equation $V = f (p_5 - p_6)/(p_3 - p_4) = f (\beta)$. V is an electrical signal.

The restrictors or fluid resistors 21 and 22 prevent excessive changes in pressures $p_5$ and $p_6$ if one of the conduits fails. That is, the restrictors prevent substantial cross flow. The pressure signals are separately utilized, while at the same time the average pressure along lines 23 and 23A is provided.

Likewise, the $p_3$ signal, or pitot pressure signal, is utilized with the pressures from ports 14A, and 15A, called $p_2$ and $p_1$, respectively and the average pressure signal, $p_4$, on line 23B is connected to separate computation apparatus indicated at 26 to provide an output $V = f (p_1 - p_2)/(p_3 - p_4) = f (\alpha)$.

The signals needed for the air data computer can be provided by the differential pressure sensors. This is, outputs representing $(p_1 - p_2)$, $(p_5 - p_6)$ and $(p_3 - p_4)$ are all that are needed. The signals are then computed to obtain the indication of angle of attack ($\alpha$) or angle of sideslip ($\beta$). The $(p_3 - p_4)$ quantity is used for calculating both angle of attack and angle of sideslip.

Referring now to FIG. 4, the schematic representation indicates a pneumatic averaging chamber 20, with pressure $p_5$ provided along line 17A, and the pressure is also sensed along line 17B, which is after the tap for separate sensing was made. Pressure $p_6$ is provided along line 16A, and has the same output carried on line 16B, which is also on the output side of the tap for the averaging apparatus. The fluid resistors are indicated at 30, which is labeled $R_1$, and 31 which is labeled $R_2$ in FIG. 4. The signals are then averaged together within the chamber 20 to provide an output $p_4$ along line 23A and 23B which are represented schematically. The analogy between this schematic circuit and an electrical half bridge circuit can be visualized quite easily by replacing the pressure signals with voltage signals, and in other words having $V_4$, $V_5$ and $V_6$ replace the pneumatic signals ($p_4$, $p_5$ and $p_6$).

The resistors 30 and 31, which are pneumatic in the form shown represent very high impedance resistors, and thus they have to have a very high pneumatic resistance in order to be operable when the input signals are also used. If the $p_5$ and $p_6$ signals were not used separately, or if small pressure changes are permitted, the fluid restriction or resistance could be lower.

The fluid resistors can be relatively long sections of very small stainless steel tubing coiled within the chamber 20, and the output end of each of the pneumatic resistors is left open to the internal chamber. In one example used in a probe as disclosed, the resistors were thirty six inch lengths of 0.041 inch I.D. tubing having an O.D. of 0.059 inches. The two output lines for $p_4$ can then be connected to this chamber 20 and of course instead of having two $p_4$ outputs, there could be only one. More than two inputs may be averaged as well.

The pneumatic averager has applications other than for calculation as disclosed herein. With the averager as disclosed three pressure outputs are available from two pressure sources. Two of the outputs represent the pressure of the sources themselves and the third output represents the average of the pressure sources. An example of other uses might be where two pressure ports or strut mounted pitot-static tubes (reference FIG. 9 of U.S. Pat. No. 4,096,744) are located on opposite sides of an aircraft fuselage. A common practice today is to manifold these two (the right and left hand) outputs pneumatically and derive one static pressure equal to the pneumatic average. If the same pneumatic average is desired, but the individual pressures are also desired, the use of a pneumatic averager at the junction of the tubing from the respective ports would allow such pressure to be utilized. From the right and left hand pressures (from the right and left hand sides), it is practical to derive an angle of sideslip signal by forming a pressure ratio as $(p_{left} - P_{right})/(p_{total} - p_{average})$. In this case the total pressure would be derived from any convenient pitot pressure source mounted either to the fuselage of the vehicle, wing, or other location. For this application because pressure differentials are much lower than for the hemispherical sensor (FIG. 1), lower resistance elements may be utilized. In this case typical resistors are a 6-inch length of 0.041-inch I.D. tubing having an O.D. of 0.059 inches.

There are further advantages of utilizing a pneumatic averager because of its high resistance. Using the averager basically blocks all cross flow between right and left hand ports on an aircraft fuselage, since the high resistance is provided between the pressure differences. The high cross flow during sideslip maneuvers is therefore eliminated.

Cross flow can bring contaminants into the aircraft pressure system. Because of the high resistance at the pneumatic averager, asymmetry in the plumbing which normally affects the accuracy and the pneumatic average in aircraft fuselage installations now become inconsequential. As an example, in one currently made aircraft, it is known that the capatain's outputs differ from the first officer's output. Each output is derived from right and left hand manifolded pressure ports across the fuselage. However, it is known that pneumatic plumbing for the two outputs is not symmetrical. In flight, differences between the captain's and first officer's outputs have been consistently noted, and this has been attributed to asymmetric plumbing. This difficulty could be eliminated if a pneumatic averager with reasonably high resistance was used at each junction of the conduits from the respective ports.

For this application the preservation of the right and left input pressures is not necessary since the derivation of sideslip angle is not required. Hence, a lower resistant unit may be utilized. Two examples of typical resistors are as follows:

1. A 3-inch length of 0.090 inch I.D. tubing of any suitable O.D. dimensions.
2. Three 0.089 inch diameter orifices installed in 0.050 inch thick material in series at 0.50 inch spacing.

What is claimed is:

1. A gaseous fluid pressure averager apparatus including output fluid pressure carrying means for providing an output pressure signal having a pressure value substantially comprising the average of a plurality of pressure input signals from input fluid pressure carrying means without creating substantial cross flow between the input fluid pressure carrying means, said apparatus comprising separate fluid resistor fluid pressure transmitting means each having a resistance to fluid flow substantially greater than the resistance to fluid flow in the input fluid pressure carrying means, each of said fluid resistor fluid pressure transmitting means coupling one of the input fluid pressure carrying means to the output fluid pressure carrying means, the input fluid pressure carrying means and the output fluid pressure carrying means being connected only through a fluid flow path including the fluid resistor fluid pressure transmitter means.

2. The apparatus of claim 1 wherein said fluid resistor pressure transmitting means each provides substantially equal resistance to fluid flow.

3. The apparatus of claim 1 in combination with an air data sensing probe, wherein said input fluid pressure carrying means comprise conduits open to pressure sensing ports on said air data sensing probe.

4. The apparatus of claim 1 wherein said input fluid pressure carrying means comprises separate pressure sensing port means, said output fluid pressure carrying means including a chamber, said fluid resistor fluid pressure transmitting means being open between the input fluid pressure carrying means and said chamber.

5. The apparatus of claim 1 and separate means connected to the input fluid pressure carrying means operable to receive a pressure signal from at least one of said input fluid pressure carrying means independent of the output fluid flow carrying means.

6. A gaseous fluid pressure averager apparatus comprising an output fluid pressure carrying means for averaging a plurality of pressures, at least two input fluid pressure carrying means open to sense input pressures at separate locations and fluid resistor means permitting fluid flow therethrough and having substantial resistance to fluid flow in relation to the resistance to fluid flow in the input fluid pressure carrying means comprising the sole fluid connection between each input fluid pressure carrying means and the output fluid pressure carrying means.

7. The fluid pressure averager of claim 6 wherein said fluid resistor means comprise lengths of small diameter tubing.

8. The fluid pressure averager of claim 6 wherein said output fluid pressure carrying means comprises a chamber open to the fluid resistor means.

* * * * *